United States Patent [19]

Miller et al.

[11] 3,941,865

[45] Mar. 2, 1976

[54] EXTRUSION OF ETHYLENE OXIDE RESINS

[75] Inventors: Walter A. Miller, Somerville; Richard G. Shaw, Asbury, both of N.J.; Paul A. King, Warwick, N.Y.

[73] Assignee: Union Carbide Corporation, New York, N.Y.

[22] Filed: Dec. 10, 1973

[21] Appl. No.: 423,450

[52] U.S. Cl. ............ 264/95; 260/29.2 EP; 264/101; 264/205; 264/209; 264/211; 264/349
[51] Int. Cl.² ...................... C08J 5/18; B29D 23/01
[58] Field of Search .......... 264/95, 205, 176 R, 211, 264/101, 349, 209, 184, 51, 53; 260/2.5 EP, 29.2 EP, 2.5 R

[56] References Cited

UNITED STATES PATENTS

| 2,528,200 | 10/1950 | Weinberg | 264/209 |
| 3,066,356 | 12/1962 | Porter | 264/211 |
| 3,177,276 | 4/1965 | Doyle et al. | 264/211 |
| 3,425,979 | 2/1969 | Monaghan et al. | 264/95 |
| 3,607,812 | 9/1971 | Takigawa et al. | 264/95 |

FOREIGN PATENTS OR APPLICATIONS

| 722,109 | 11/1965 | Canada | 264/176 |

*Primary Examiner*—Jeffrey R. Thurlow
*Attorney, Agent, or Firm*—J. Hart Evans

[57] ABSTRACT

The facile extrusion of ethylene oxide resins has been effected by employing water as an extrusion aid.

8 Claims, No Drawings

EXTRUSION OF ETHYLENE OXIDE RESINS

BACKGROUND OF THE INVENTION

This invention pertains to the extrusion of ethylene oxide resin and more particularly to the extrusion of films, pipes, tubings, rods, filaments and other articles from normally solid ethylene oxide polymer compositions using water as an extrusion aid. In addition it also pertains to the use of certain of the so extruded products for packaging materials and dispensing them in water.

At the present there are two methods of preparing poly(ethylene oxide) film, viz., a calendering process or solvent casting. Both of these methods are expensive because of the equipment used in the former process and of the time required in the latter process. Furthermore maintenance of calendering rolls is a tedious chore requiring extraordinary steps to prevent scoring or marring of the calendar rolls surface. In the case of calendering the obtainment of films of uniform thickness is also a problem due to problems encountered with poly(ethylene oxide) resins. For example this resin is subject to chain scission and oxidative degradation.

While the extrusion of poly(ethylene oxide) has been reported, this method had not been hitherto commercial. Since polymers of ethylene oxide have high melt strength and very high melt viscosity, the usual methods known to the art of dealing with these problems are to raise the stock temperature or reduce the back pressure by die design. Polymers of ethylene oxide degrade very rapidly at elevated temperatures both in air and inert environments. Die modifications can be successfully employed for heavy wall sectioned articles but this approach is, e.g., not useful for producing high quality thin gauge film. Although novel and unusual extrusion conditions such as low extrusion temperature coupled with low back pressure have been cited, this has not proved to be reliable. It has at best limited utility and does not appear generally applicable by those skilled in the art. Thus, for example Canadian No. 722,109 describes a process for the dry extrusion of ethylene oxide polymers but this was accomplished by the use of low resistance or low pressure drop film dies which do not give as acceptable an extruded product as the high pressure drop dies used both in the instant invention and preferred by those currently skilled in the art. The high pressure dies afford a more uniform product, by virtue of their spiral configuration, than the low pressure dies which are characterized by having a simple straight, non-spiral die configuration. It should be noted that the pressures reported in Canadian No. 722,109 are "die pressures" and not the maximum extruder pressures often referred to as "head pressures" which are much higher than the former. Thus, for example, while the die pressures reported in Canadian No. 722,109 at page 15 are of the order of 1800 psi, the head pressures are of the order of about 5000 psi. It is the high head pressure encountered in extruding ethylene oxide polymers which has been the stumbling block in the commercial development of these resins. The extrusion of unmodified poly(ethylene oxide) at practical flow rates produces head pressures which would blow the extruder head of commercially available extrusion equipment and warp their screw drives.

STATEMENT OF THE INVENTION

An improved method for the extrusion of normally solid ethylene oxide resin into useful articles has been found which comprises extruding a composition comprising normally solid ethylene oxide resin containing about 4 to about 200 parts by weight of water per 100 parts by weight of ethylene oxide resin such that the melt flow of said composition lies in the range of about 0.05 to about 20 decigrams per minute, when measured in accordance with ASTM D 1238-57T modified in that measurements were made at 85°C. and 43.25 psi, and preferably in the range of about 0.1 to about 10 decigrams per minute.

The extrusion temperatures are not narrowly critical. Useful extrusion temperatures are limited on the low side by the melting point of the polymer composition and on the high side by the permissible rates for evaporation of water. For example, the softening point for most ethylene oxide polymers lies between 55° and 65°C. Experience has shown that at atmospheric pressures such as those used in blown film extrusion, stock temperatures of about 120°C. can be used without void formation in the film. Those extrusion processes that normally operate above atmospheric pressure, such as, injection molding can accordingly tolerate higher operating temperatures.

The term extrusion is used herein to include injection molding as well as blow molding, slot casting and other procedures known in the art under this term.

The term "ethylene oxide resins" as used in the instant invention excompasses not only the homopolymer, poly(ethylene oxide), but also copolymers of ethylene oxide in which ethylene oxide is copolymerized with other alkylene oxides such as propylene oxide, butylene oxide, styrene oxide and the like and other comonomers copolymerizable with ethylene oxide.

The extrusion method of this invention is particularly useful for the fabrication of blown film by tubular extrusion. Uniform gauge film can be prepared having only 2% by weight of water at windup and dry to the touch. This unexpected result, due to the migration of the water after extrusion and during the blowing process, provides a film having good block and slip characteristics. This unusually rapid migration of water from the blown film enables the fabricator to enjoy the beneficial effects of a processing aid during the extrusion process without having to suffer its presence in the final blown film product, as is the usual case when processing aids are used. In addition the evaporation of water provides a beneficial cooling action which in turn promotes higher film production rates.

The extrusion process of this invention is not limited to the preparation of blown film but may be used for the preparation of extruded articles in general such as monofilaments, pipe, rods, sheets, injection molded articles and the like.

The limits of the water content of the ethylene oxide resin during the extrusion process are critical. Amounts of water below the lower limit do not reduce the operating pressures or increase the throughput rate enough. Amounts of water above the upper limit are equally impractical since although the extrusion pressures and throughput rates are acceptable, a satisfactory extruded article cannot be obtained. Blown films are especially sensitive being marred by blowholes and lacking sufficient strength to be handled by commercially available film blowing equipment when the water content is too high. It is preferred to use about 10 to about 20 parts of water per 100 parts of ethylene oxide resin.

Operating pressures of conventionally used extrusion equipment preclude the unassisted extrusion of ethylene oxide polymer resin because of its high melt viscosity. The heads of such equipment would invariably be blown because of the inordinately high pressures which these resins require for their extrusion without an extrusion aid. The maximum practical extrusion pressure is about 8000–10,000 psi for most industrial equipment. As will also be readily recognized by those skilled in the art the throughput rate must be high for the extrusion of ethylene oxide resins for the practical use of the expensive equipment required. The method of this invention provides extruder throughout rates of up to about 4 pounds per hour of ethylene oxide resin extrudate per inch of die width and yet remain below the maximum equipment pressures limitations. Under normal operating conditions unmodified ethylene oxide resin cannot be extruded with these pressure and rate limitations in a commercial process.

The physical and mechanical properties of the blown film obtainable by the practice of this invention are all satisfactory and meet commercial specifications. For example tensile strengths in both the machine and transverse direction were found to be about 2000 to 2500 psi. Uniaxially oriented tapes were also made from the blown film obtained having tensile strengths of 10,000 to 25,000 psi. These oriented tapes are useful in the fabrication of flower and vegetable seed tapes.

The unoriented blown films are uniquely useful for packaging toxic, water dispersible powders such as insecticides, fungicides, bactericides and the like. For example a bag may be fabricated from blown poly(ethylene oxide) film obtained by the instant invention, the water disperisble powder heat sealed within and the resultant bag enclosed in a second bag of cheap, water insensitive resin such as polyethylene, polypropylene, polystyrene, vinyl chloride resin or the like. When preparation of a dispersion of the powder in water is desired, the outer bag is simply opened and the inner bag of poly(ethylene oxide) film containing the powder dropped into water. The poly(ethylene oxide) film disintegrates and dissolves rapidly leaving the powder dispersed in the water vehicle.

Another advantage of the films available through this invention over those of the prior art lies in the low densities obtainable, i.e., about 1.0 to 1.2 g./cc. This property enhances the economical utilization of film since film is sold by the pound and utilized by the square foot. Thus one obtains a greater area coverage per unit weight as the density is lowered.

The normally solid ethylene oxide resins preferably employed have weight average molecular weight of about 250,000 to about 5,000,000. A description of available ethylene oxide resins is given by F. W. Stone and J. J. Stratta in the Encyclopedia of Polymer Science and Technology, Volume 6, pages 103–145, John Wiley & Sons, Inc. 1967 which is incorporated herein by reference.

Additives, dyes or colorants can also be incorporated in the resins susceptible to this invention. For example alkylated phenols can be added as stress cracking and oxidation stablilizers, and ethoxylated alkylated phenol surfactants as well as heat stabilizers, ultraviolet light absorbers, fillers and the like.

Conventional, commercially available extrusion and film blowing equipment can be used in providing the films described herein.

The invention is further described in the Examples which follow. All parts and percentages are by weight unless otherwise specified.

EXAMPLE I

A 6 inches × 12 inches, oil-heated, two roll mill was used to blend 19% by weight of water into normally solid poly(ethylene oxide) sheet resin, having a number average molecular weight of about 600,000, at a temperature of about 100°C. The resin sheet was weighed before and after addition of the water to determine the water content. The total milling time was about seven minutes. The sheet was then cut into 1 inch strips. The 1 inch strips were fed to a 1 inch × 18 inch Egan extruder fitted with a 2 inch diameter 20 mil lip gap film die, cooling ring, collapsing frame, and take up rolls. The temperatures in the extruder were set to about 94°C. for extrusion and blowing. Table 1 contains pertinent information on extrusion conditions. The films produced appeared opaque, smooth, supple and were dry to the touch, and free of blocking characteristics.

Room temperature mechanical properties of the extruded film are presented in Table 2 and were obtained in conformity with ASTM D 882-56T.

TABLE 1

| EXTRUSION BLOWING ON 1" EGAN EXTRUDER | |
|---|---|
| Typical Extrusion Conditions | Film |
| Screw, °C | Polyethylene type screw, no heat on |
| Hopper Water | on |
| Rear Zone, °C | 53 |
| Front Zone, °C | 83 |
| Head, °C | 83 |
| Die, °C | 88 |
| Output | |
| Screw, RPM | 26–40 |
| Gauge, Mils | 2–20 |
| Wind-up, ft/min. | 5–23 |
| Lay flat, in. | 1.5"–5", mostly 3" |
| Die Pressure, psi | 1500–2000 |
| Cooling | |
| Type and Amount | auxiliary cooling ring |
| Temperature, °C | room temperature |
| Frost Line, in. | 10" from die |
| Draw Distance, in. | 34 |
| Miscellaneous | |
| Pressure on Nip Roll, psi | 30–60 |
| Surging | none |
| Screen Pack | 60 mesh |

TABLE 2

ROOM TEMPERATURE MECHANICAL PROPERTIES ON EXTRUDED POLY(ETHYLENE OXIDE) BLOWN FILM

| Material | Modulus (psi) | Yield Strength (psi) | Yield Elong. | Tensile Strength (psi) | Elong. at Break | Gauge Length Dimensions of Test Specimen |
|---|---|---|---|---|---|---|
| 6 FPM[a] M.D.[b] | 29,700 | 1,025 | 10% | 2,150 | 895% | 1" × 0.5" |
| 6 FPM T.D.[c] | 50,000 | 1,350 | 7% | 2,415 | 880% | " |
| 8 FPM M.D.[b] | 30,000 | 970 | 7% | 2,100 | 770% | " |

TABLE 2-continued

ROOM TEMPERATURE MECHANICAL PROPERTIES ON EXTRUDED POLY(ETHYLENE OXIDE) BLOWN FILM

| Material | Modulus (psi) | Yield Strength (psi) | Yield Elong. | Tensile Strength (psi) | Elong. at Break | Gauge Length Dimensions of Test Specimen |
|---|---|---|---|---|---|---|
| 8 FPM T.D.[c] | 64,000 | 1,400 | 8% | 2,400 | 700% | " |
| 12 FPM M.D.[b] | 28,500 | 900 | 10% | 1,900 | 625% | " |
| 12 FPM T.D.[c] | 60,000 | 1,350 | 10% | 2,200 | 690% | " |

[a]Feet per minute
[b]Machine direction
[c]Transverse direction

EXAMPLE II

The equipment and procedure described in Example I were used with the exception that sheets of poly(ethylene oxide) having a weight average molecular weight of about 600,000 containing 15% by weight of water were prepared on the two roll mill and then immediately granulated in a H. B. Johanssons Chuck Fabrik hot melt granulator Extrusion and blowing conditions were similar to those of Example I as was the quality of the film upon windup. Pertinent data are presented in Table 3 for the preparation of both film and oriented tape. Table 4 contains mechanical properties at room temperature of both film and oriented tape measured in conformity with ASTM D 882-56T.

TABLE 3

POLY(ETHYLENE OXIDE) EXTRUSION BLOWING ON 1" EGAN EXTRUDER
EXAMPLE II

| Typical Extrusion Conditions | Oriented Tape | Film |
|---|---|---|
| Screw Type | Polyethylene | Polyethylene |
| Hopper Water | on | on |
| Rear Zone, °C | 83 | 83 |
| Front Zone, °C | 88 | 88 |
| Head, °C | 88 | 88 |
| Die, °C | 83 | 83 |
| Output | | |
| Screw, RPM | 30 | 40 |
| Rate, lb/hr | ~3.5 | — |
| Gauge, mils | 2–9 | 8–17 |
| Wind-up, ft/min. (Bottom) | 2.5 | 5 |
| Wind-up, ft/min. (Top) | 22–30 | — |
| Lay Flat, in. | 1.5–2.5 | 1.5–2.5 |
| Die Pressure, psi | 1500–2000 | 1500–2000 |
| Cooling | | |
| Type and Amount | auxiliary cooling ring | |
| Temperature, °C | Room temperature | |
| Frost Line, in. | 8–12" from die | |
| Draw Distance, in. | 34 | |
| Extrudability | | |
| Blow Holes/10 min. | — | none |
| Screen Packs (mesh size) | | 60, 100, 60 |

TABLE 4

ROOM TEMPERATURE MECHANICAL PROPERTIES[a] ON EXTRUSION BLOWN POLY(ETHYLENE OXIDE) TAPE AND FILM
EXAMPLE II

| Material | Sample No. | Modulus (psi) | Yield Strength (psi) | % Yield Elong | Tensile Strength (psi) | % Elong. at Break | Thickness Range (Mils) | Width (in.) | Appearance |
|---|---|---|---|---|---|---|---|---|---|
| Oriented Tape | | | | | | | | | |
| | M.D.[b] No. 1 | 115,000 | 4,800 | 11 | 18,400 | 100 | 4–5 | 13/16 | hazy |
| | M.D. No. 2 | 91,000 | 3,300 | 10.5 | 11,000 | 94 | 8–9 | 7/16 | hazy |
| Film | | | | | | | | | |
| | M.D. No. 1 | 55,000 | 1,400 | 6 | 1,700 | 1,150 | 8–17 | 2.25 | hazy |
| | T.D.[c] No. 1 | 80,000 | 1,400 | 4 | 1,250 | 250 | 8–17 | 2.25 | hazy |
| | M.D. No. 2 | 36,000 | 1,000 | 10 | 2,000 | 1,300 | 12–14 | 2.187 | hazy |
| | T.D. No. 2 | 40,000 | 1,100 | 10 | 1,700 | 1,400 | 12–14 | 2.187 | hazy |

[a]Materials tested at Instron crosshead speed at 2"/min. Samples were 1/4" × 1".
[b]Machine direction
[c]Transverse direction

CONTROL A

Normally solid poly(ethylene oxide) resin powder, having a number average molecular weight of 600,000 was fed to a 1 inch × 18 inch Egan extruder fitted with a 2 inch diameter 20 mil lip gap film die at an extruder temperature of about 94°C. The extruder screw speed was increased from 0 to 3 rpm and the poly(ethylene oxide) resin fed into the die. The extruder head pressure rose to over 5000 psi. Flow from the die was at a very low ouput rate. Screw speed was then increased to improve the output rate. The head pressure rose dramatically and would have exceeded 11,000 psi at screw speeds over 10 rpm. Obviously screw speeds of 20–60 rpm were not achievable with the head pressure limitation of 11,000 psi. That is to say at approximately 12,000 psi the extruder and head would separate (broken head bolts). The contribution of the screen pack pressure drop, die adapter pressure drop, die channel pressure drop and die lip pressure drop collectively adds up to this high head pressure. Heretofore other investigators have attempted to solve this pressure problem using the equipment with low die lip pressure configurations, low die channel pressure drop and low die adapter pressure drop. While they did achieve some success these configurations do not permit the preparation of commercially acceptable quality film. For example, the films exhibit evidence of poor mixing, low shear, non-uniform temperature, non-uniform flow patterns and are in general very rough surfaced or rugose.

EXAMPLE III

Dry poly(ethylene oxide) resin powder having a weight average molecular weight of about 600,000 was fed into a 2-½ inch diameter MPM extruder (13.7:L:D ratio) fitted with a 6 inch diameter spiral flow film die and having associated film processing hardware similar to that described in Example I with 10% by weight of water. The extruder was fitted with a fluted polyethylene type screw designed for high shear (good mixing). The poly(ethylene oxide) blend fed and extruded well. The tube was inflated up to three times its original diameter, collapsed and the flat film collected. Good quality film, principally of 2.5 mil gauge and 18 inches lay flat, was prepared. Pertinent data are presented in Table 5 for the preparation of film.

TABLE 5

EXTRUSION BLOWING ON 2½'' MPM TUBULAR EXTRUDER WITH FLUTED POLYETHYLENE SCREW
Screen Pack (Mesh) 20, 60, 100, 20 Die Diameter: 6''
Orifice 20 Mils

| EXTRUDER | SET |
|---|---|
| No. 1 Cylinder °C. | off |
| No. 2 Cylinder °C. | 72 |
| No. 3 Cylinder °C. | 72 |
| No. 4 Cylinder °C. | 83 |
| Head °C. | 83 |
| Adapter °C. | 83 |
| Hopper Water on | yes |
| DIE | |
| Top Heater °C. | 83 |
| Bottom Heater °C. | 83 |
| Comp. Temp. Variation. °C. | slight |
| Compound Temperature °C. | 218 |
| Die Pressure, psi | 5000–6000 |
| Press. Variation, psi | slight - no surging |
| OUTPUT | |
| Screw, R.P.M. | 60 |
| Wind-up Speed, ft./min. | 10 |
| Gauge, mils | 2.5 |
| Blow ratio, in. lay flat | 2:1 |
| Screw Power, amp. | 120 |
| Lay flat, in. | 18 |
| COOLING | |
| Air Ring | air ring used |
| Temp. Cooling. °C. | 18 |
| Frost Line, in. | 15 |
| Nip Roll Height, ft. | 8 |
| Rel. Humidity, % | ~70 |
| REMARKS: | |
| Slit at Take Off | no |
| Blow Holes/10 min. | 0.5 |
| Blocking at Take Off | no |
| Film Quality | good |

EXAMPLE IV

The fugitive nature of the water used as a processing aid for the tubular extrusion of poly(ethylene oxide) resin into blown film was demonstrated by measuring the room temperature mechanical properties of the film obtained from Example I and II 48 hours and 192 hours after extrusion and blowing. The closeness of these values (Table 6) indicates that most of the water added was removed during the extrusion and blowing operations.

TABLE 6

ROOM TEMPERATURE MECHANICAL PROPERTIES ON POLY(ETHYLENE OXIDE) FILM 48 AND 192 HOURS AFTER EXTRUSION

| EXAMPLE | MODULUS, (PSI) | YIELD STRENGTH (PSI) | YIELD ELONG. % | TENSILE STRENGTH (PSI) | % ELONG. AT BREAK | TIME, PROPERTIES OBTAINED AFTER FILM WAS EXTRUDED |
|---|---|---|---|---|---|---|
| I M.D. | 37,000 | 995 | 5.5 | 2,200 | 670 | 48 hrs. |
| I T.D. | 64,000 | 1,575 | 9.5 | 2,700 | 720 | 48 hrs. |
| II M.D. | 30,000 | 970 | 7 | 2,100 | 770 | 192 hrs. |
| II T.D. | 64,000 | 1,400 | 8 | 2,400 | 700 | 192 hrs. |

EXAMPLE V

A monofilament was prepared from poly(ethylene oxide) using a 1 inch NRM extruder with an extruder die having a diameter of 0.080 inch, a take-off Godet, a stretching Godet and a Coning Machine (take-up spool).

A powder blend of 100 parts of normally solid poly(ethylene oxide) resin having a number average molecular weight of about 600,000, ten parts of Tergitol NP-33 (an ethylene oxide adduct of nonyl phenol sold as a nonionic surfactant) and 10 parts of water was fed to the 1 inch NRM extruder. The extruder temperature settings were (88°C.), (127°C.), (99°C.) and (116°C.), from the inlet to discharge zones repsectively. The extruder was operated at 30 r.p.m.

The extrudate was pulled from the die with the Take-off Godet at 11.5 ft./min. It was then uniaxially stretch oriented by being pulled by the Stretching Godet at a speed of 90 ft./min. (7.8 to 1 stretch ratio). The oriented poly(ethylene oxide) monofilament exhibited the following mechanical properties:

| | |
|---|---|
| Tensile modulus (ASTM D 882-56T) | 68,000 psi |
| Yield Strength (ASTM D 882-56T) | 6,800 psi |
| Yield Elongation (ASTM D 882-56T) | 46% |
| Tensile Strength (ASTM D 882-56T) | 28,000 psi |
| Elongation at break (ASTM D 882-56T) | 260% |

EXAMPLE VI

Tubing was extruded from poly(ethylene oxide) using a 1 inch NRM extruder having a ⅜ inch O.D. tubing die, a tubing take-off machine and an air-cooled mandrel.

A powder blend of 100 parts of normally solid poly(ethylene oxide) resin having a number average molecular weight of about 600,000, 10 parts of Tergitol NP-33 and 10 parts of water was fed to the 1 inch NRM extruder. The extruder and die temperatures were maintained at about (83°C.). Using an extrusion pressure of about 2,000 to 2,500 psi, and an air-cooled mandrel, uniform, good quality ⅜ inch O.D. poly(ethylene oxide) tubing was obtained at an extrusion rate of 2 to 5 foot per minute.

Although the invention has been described in its preferred forms with a certain degree of particularity, it is understood that the present disclosure of the preferred forms has been made only by way of example and that numerous changes may be resorted to without departing from the spirit and scope of the invention.

What is claimed is:

1. Method of extruding normally solid ethylene oxide resin which comprises extruding a composition comprising normally solid ethylene oxide resin containing about 4 to about 200 parts by weight of water per 100 parts by weight of ethylene oxide resin such that the melt flow of said composition lies in the range of about 0.05 to about 20 decigrams per minute when measured in accordance with ASTM D 1238-57 T modified in that measurements were made at 85°C. and 43.25 psi.

2. Method claimed in claim 1 wherein the normally solid resin is a homopolymer of ethylene oxide.

3. Method claimed in claim 1 wherein the normally solid resin contains about 10 to about 20 parts of water.

4. Method claimed in claim 1 wherein the melt flow of the composition lies in the range of about 0.1 to 10 decigrams per minute.

5. Method claimed in claim 2 wherein the composition is used to prepare blown film by tubular extrusion.

6. Method claimed in claim 5 wherein the blown film contains a maximum of about 2% by weight of water at windup.

7. Method claimed in claim 2 wherein the composition is used to prepare a monofilament.

8. Method claimed in claim 2 wherein the composition is used to prepare tubing.

* * * * *